Patented July 14, 1942

2,290,033

UNITED STATES PATENT OFFICE 2,290,033

CATALYTIC AROMATIZATION OF HYDROCARBONS

Robert E. Burk and Everett C. Hughes, Cleveland Heights, Ohio, assignors to The Standard Oil Company, Cleveland, Ohio, a corporation of Ohio No Drawing. Original application March 17, 1939, Serial No. 262,492. Divided and this application September 30, 1939, Serial No. 297,414

12 Claims. (Cl. 260—668)

It has been known for some time to catalytically react on hydrocarbons, alcohols etc. with catalysts involving chromium oxide, alone or with some other material. Hence, in treating hydrocarbons of aliphatic character for dehydrogenation or formation of aromatic compounds, it has been known to use compound catalysts predominantly of chromium oxide with a lesser amount of aluminum oxide. That is, half and more of chromium oxide has constituted the catalyst. It has also been known to employ catalysts in which a small amount of chromium oxide, not over ten per cent was involved. The characteristics of such prior known catalysts are the handicap of rapid falling off of activity, and the unsatisfactoriness of regeneration. Catalysts containing chromium oxide in large proportion are not desirably resistant to heat and oxidizing atmosphere, and their practicality is thus seriously affected. In the production of catalysts involving chromium oxide moreover, where co-precipitation is involved, there has been a serious lack of uniformity within the particles and lack of uniformity from batch to batch. Catalysts are critical and sensitive, and particularly where an oxide type of composition is concerned particular tendency to very erratic outcome exists, and has occasioned disappointing results in practice. We have now discovered how to obviate difficulties of preparation and erratic behavior in operating results, and a superior activity and regenerability may be had.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Where catalysts are prepared by the old procedure of precipitating a mixture of salts in solution, on the addition of the precipitating base one of the compounds is first precipitated and then the other and the precipitate is inherently non-uniform, the relative amounts varying greatly from the inside to the surface of the precipitated masses. This difference exists generally in greater or less degree where two or more elements are co-precipitated, even where the solubility properties of the components would not primarily indicate such possibility so plainly. And, in the precipitation, the formation of respective nuclei of the different components is dependent upon variable factors such as the speed of formation of ions respectively, and the number of molecules required to form a nucleus, this in turn being related to factors of surface tension, etc.; and inherently in gross precipitation from a solution in which the components are present in theoretical proportions the proportions do not follow invariably in the precipitate. In precipitating compound catalysts, we effect the precipitation in a manner controlling the amount of the precipitant in proper time. We have foüund that where chromium oxide is employed, and another catalyst component is co-precipitated, there is a peculiar criticalness of range in which a high peak of activity in the product may be attained. This is all the more surprising, in view of the general supposition that a catalyst for action of chromium oxide would be better in proportion as the chromium oxide predominated increasingly. Contra to this however, we have found that there is a narrow range, viz. eighteen to thirty mol per cent of chromium oxide, which provides disproportionately high activity, and the peak is at about twenty mol per cent. Catalysts prepared in such relative proportions are outstanding in their properties; and the other component may be such as aluminum oxide. And within such critical proportions superior catalysts may be had even by forming by the old method of precipitation involving simply bringing the precipitant and metal salt solution together by pouring of one into the other; but much better results may be had by controlled precipitation in which the precipitant is brought into reaction in lag of amount theoretically requisite for precipitation of the metal salts present at any given moment, as detailed hereinafter.

The components for the catalyst may be provided by precipitating salts thereof in solution, individually or together, and for the precipitant we prefer ammonia, aqueous or gaseous. With particular advantage, ammonia as such, for instance the gas conveniently, may be supplied to the mixing zone, and where precipitating by the controlled or lag feed of the precipitant, the gaseous ammonia may be fed up to a desired amount, and the precipitation may then be completed by the feeding ammonium hydroxide up to the remaining amount theoretically requisite to complete the precipitation.

As an example: Nitrates of aluminum and chromium are dissolved in distilled water to amounts to provide 80 per cent and 20 per cent of aluminum and chromium respectively (the nitrate ion is seen to be the same in both molecules and not per se affecting the proportion), the solution is warmed, for instance to about 55° C., and pumping thereof is started into a mixing chamber having suitable agitating means, the pumping or flow being in smooth-flow stream. Shortly after starting the feed of the solution, ammonia gas is fed into the mixing zone, and the feed of solution, and of the ammonia thus in lag, is continued until the solution has been all supplied and the ammonia has gone to about 70 per cent of the theoretically required amount for precipitation, the mixing zone to which these are fed having a content of ammonium acetate solution (120 parts of ammonium acetate to 4,000 parts of water, and the total nitrate solution having been 2,000 parts of water). The theoretically required amount of ammonia for precipitation is now added in the form of ammonium hydroxide, for instance at the rate of 620 parts of 3.17 N ammonium hydroxide per 2,000 parts of distilled water. The precipitate is washed thoroughly and is filtered.

As another example: An 80 mol per cent aluminum oxide and 20 mol per cent chromium oxide catalyst is prepared by a two-stage precipitation, by feeding at a rate of 600 cc. per minute a solution containing 6.4 mol aluminum nitrate, 1.6 mol chromium nitrate (i. e. four times as much aluminum as chromium or 80:20 in per cent, the nitrate ion not affecting the proportion) and 960 g. of ammonium acetate per each 48 liters of solution, the solution being fed into a mixing zone of 600 cc. capacity where gaseous ammonia is also supplied at a rate to effect 70 per cent neutralization, the over-flow from such mixing zone proceeding into another mixing zone of the same capacity into which a solution of 680 g. of concentrated ammonium hydroxide per 16 liters of water is also fed at a rate of 200 cc. per minute (this constituting 50 per cent of the theoretically required ammonia). From the second mixing zone the liquid flows on to a filter, and filtration is carried on in pace. The catalyst is dried in an air oven at 140–150° F. for 60 hours and is vacuum dried at 425° F. for 12 hours.

The catalyst mass may be subdivided by grinding after drying, but as an especial feature of the invention, the precipitated catalyst is divided into particles of desired size by procedure which avoids grinding. Furthermore, grinding results in an excessive amount of fines. When grinding is employed we may return the fines to an earlier stage for incorporation, such for instance as the filtering. Our preferred procedure is to subdivide the precipitate while it is still moist, and this may be accomplished by forming or molding, and preferably by extruding the mass to rod-form, such as three-eighths inch diameter, and cutting the rod into three-eighths inch lengths.

The precipitated catalyst is dried before being contacted with the material to be catalyzed.

The catalyst, after a first stage of drying, may be put in place in the apparatus in which it is to be used, and the temperature may therein be raised to 300° F.–900° F. for ½–16 hours to finish the drying. Optionally a vacuum may be applied. Then, the temperature is raised to preferably 932° F., and with the pressure about atmospheric, the raw material for reaction on the catalyst may be fed in. The chromium, as well understood, in chromic oxide form, is in accordance with our manner of production peculiarly uniform and active. The raw material may be for example hydrocarbons which are normally gaseous such as ethanes or propane, or pure hydrocarbons such as n-hexane, n-heptane, n-octane, etc., or naphthas or distillates from petroleum stocks predominantly non-benzenoid, as for instance derived from Pennsylvania, Michigan, Kentucky, Ohio, Mid-Continent and the like petroleum. Thus, a Pennsylvania or Michigan naphtha of boiling range 140–420° F. may be supplied to the catalyst in vapor form at a flow-rate of 0.1–10 gallons of liquid per hour per gallon volume of catalyst. With lower temperature, the feed rate may be correspondingly reduced, down to about 750° F., and for instance with such an 80 Al–20 Cr catalyst, a flow-rate of 0.21 gal./hour/gal. of catalyst shows conversion of 77 per cent at a temperature of 800° F. Temperatures up to 1080–1100° F. are permissible with certain catalysts, and are applicable with partly spent catalysts, and with increased flow-rates. Pressure in the catalyst reaction chamber may be from atmospheric to 400 pounds per square inch. Desirably, the feed vapors may have an admixture of a diluent. This may be hydrogen or the off-gases from the process recycled. Such recycling prolongs the useful run. When the activity of the catalyst declines to a predetermined point, as for instance to the point where there is 10 per cent coke deposited on the catalyst, it is regenerated, and this may be performed in situ if desired, by supplying to the catalyst at a temperature of 750–1250° F., dry oxygen containing gas such as air, or oxygen diluted with a gas such as nitrogen. With catalyst compositions of aluminum oxide and chromium oxide in which the respective oxides are within the critical limits of 70–82 per cent for the aluminum oxide and 18–30 per cent for the chromium oxide, remarkable high activity may be attained, as indicated, and the peak activity peculiarly occurs at the 80 per cent aluminum oxide and 20 per cent chromium oxide composition. With catalysts then within such ranges also, regeneration may be had particularly effectively and with preservation of long activity.

This application is a division of our application Ser. No. 262,492, filed March 17, 1939, which in turn is a continuation, in part as to common subject matter, of our application Ser. No. 228,005, filed Sept. 1, 1938.

Other modes of applying the principle of the invention may be employed, change being made as regards the details described, provided the features stated in any of the following claims, or the equivalent of such, be employed.

We therefore particularly point out and distinctly claim as our invention:

1. A process of the character described, which comprises reacting a predominantly non-benzenoid petroleum naphtha to convert non-benzenoid hydrocarbons to aromatic hydrocarbons by a catalyst which consists of a co-precipitated gel mixture of 20:80 mol per cent of chromium and aluminum oxides respectively, and at a temperature of 750–1250° F.

2. A process of the character described, which comprises reacting a predominantly non-benzenoid petroleum naphtha to convert non-benzenoid hydrocarbons to aromatic hydrocarbons by contact-catalyzing non-benzenoid constituents, at a temperature of 750–1250° F., with a catalyst which consists of a co-precipitated gel mixture of the composition limits not less than 18 or more than 30 mol per cent of chromium oxide and not more than 82 or less than 70 mol per cent of aluminum oxide.

3. A process of the character described, which comprises reacting a predominantly non-benzenoid petroleum naphtha to convert non-benzenoid hydrocarbons to aromatic hydrocarbons by contact-catalyzing non-benzenoid constituents, at a temperature of 750–1250° F., with a catalyst which consists of a co-precipitated gel mixture of the composition limits not less than 18 or more than 30 mol per cent of chromium oxide and not more than 82 or less than 70 mol per cent of aluminum oxide, and recontacting at least a part of the uncondensed portion of the products with the catalyst along with fresh naphtha.

4. A process of the character described, which comprises reacting a predominantly non-benzenoid petroleum naphtha to convert non-benzenoid hydrocarbon constituents, at a temperature of 750–1250° F., with a co-precipitated gel catalyst mixture which consists of 20:80 mol per cent of chromium and aluminum oxides, respectively, and characterized by uniformity from co-precipitation of the chromium and aluminum components with a precipitant introduced in deficiency of the theoretical amount for complete precipitation.

5. A process of the character described, which comprises reacting a predominantly non-benzenoid petroleum naphtha to convert non-benzenoid hydrocarbons to aromatic hydrocarbons by contact-catalyzing non-benzenoid constituents with a co-precipitated gel catalyst consisting of a mixture of the composition limits not less than 18 or more than 30 mol per cent of chromium oxide and not more than 82 or less than 70 mol per cent of aluminum oxide and characterized by uniformity from co-precipitation of the chromium and aluminum components with gaseous ammonia introduced less than the molecular equivalent with respect to the catalyst salts and with completion by aqueous ammonia.

6. A process of the character described, which comprises reacting non-benzenoid hydrocarbons containing at least 6 carbon atoms to aromatic hydrocarbons by catalyzing with a co-precipitated gel consisting of a mixture of 20:80 mol per cent of chromium and aluminum oxides respectively, at a temperature of 750–1250° F.

7. A process of the character described, which comprises changing non-benzenoid hydrocarbons containing at least 6 carbon atoms to aromatic hydrocarbons by contact-catalyzing such non-benzenoid hydrocarbons, at a temperature of 750–1250° F., with a co-precipitated gel catalyst consisting of a mixture of the composition limits not less than 18 or more than 30 mol per cent of chromium oxide and not more than 82 or less than 70 mol per cent of aluminum oxide.

8. A process of the character described, which comprises changing non-benzenoid hydrocarbons to aromatic hydrocarbons containing at least 6 carbon atoms by contact-catalyzing such non-benzenoid hydrocarbons, at a temperature of 750–1250° F., with co-precipitated gel catalyst consisting of a mixture of the composition limits not less than 18 or more than 30 mol per cent of chromium oxide and not more than 82 or less than 70 mol per cent of aluminum oxide, and recontacting at least a part of the uncondensed portion of the products with the catalyst along with fresh naphtha.

9. A process of the character described, which comprises reacting non-benzenoid hydrocarbons containing at least 6 carbon atoms to aromatic hydrocarbons at a temperature of 75°–1250° F. by contact-catalyzing with a contact material consisting of a 20:80 mol per cent co-precipitated gel mixture of chromium and aluminum oxides respectively, and characterized by uniformity from co-precipitation of the chromium and aluminum components with a precipitant introduced in deficiency of the theoretical amount for complete precipitation.

10. A process of the character described, which comprises reacting non-benzenoid hydrocarbons containing at least 6 carbon atoms to aromatic hydrocarbons at a temperature of 750–1250° F. by contact-catalyzing with a co-precipitated gel consisting of a mixture contact material of the composition limits not less than 18 or more than 30 mol per cent of chromium oxide and not more than 82 or less than 70 mol per cent of aluminum oxide and characterized by uniformity from co-precipitation of the chromium and aluminum components with gaseous ammonia introduced less than the molecular equivalent with respect to the catalyst salts and with completion by aqueous ammonia.

11. A process of the character described, which comprises reacting non-benzenoid hydrocarbons containing at least 6 carbon atoms to aromatic hydrocarbons by catalyzing with a co-precipitated gel consisting of a mixture of 20:80 mol per cent of chromium and aluminum oxides respectively, at a temperature of 750–1250° F. and feed rate of one gallon per hour per gallon of catalyst.

12. A process of the character described, which comprises reacting non-benzenoid hydrocarbons containing at least 6 carbon atoms to aromatic hydrocarbons at a temperature of 750–1250° F. by contact-catalyzing with a co-precipitated gel mixture contact material consisting of a co-precipitated gel mixture of 20:80 mol per cent of chromium and aluminum oxides respectively and characterized by uniformity from co-precipitation of the chromium and aluminum components with a precipitant introduced in deficiency of the theoretical amount for complete precipitation, and maintaining the feed rate of the non-benzenoid hydrocarbons at one gallon per hour per gallon of the contact material.

ROBERT E. BURK.
EVERETT C. HUGHES.